US012711408B2

(12) United States Patent
Hartley et al.

(10) Patent No.: US 12,711,408 B2
(45) **Date of Patent: *Aug. 18, 2026**

(54) GENERATING HYPOTHESES AND RECOGNIZING EVENTS IN DATA SETS

(71) Applicant: GEORGETOWN UNIVERSITY, Washington, DC (US)

(72) Inventors: David M. Hartley, Rockville, MD (US); Nili S. Yossinger, Washington, DC (US); Ophir Frieder, Washington, DC (US)

(73) Assignee: GEORGETOWN UNIVERSITY, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,674

(22) Filed: Jan. 24, 2024

(65) Prior Publication Data

US 2024/0281682 A1 Aug. 22, 2024

Related U.S. Application Data

(63) Continuation of application No. 17/059,985, filed as application No. PCT/US2019/034824 on May 31, 2019, now Pat. No. 11,887,018.

(Continued)

(51) Int. Cl.
*G06N 5/04* (2023.01)
*G06F 16/31* (2019.01)
(Continued)

(52) U.S. Cl.
CPC ........... *G06N 5/041* (2013.01); *G06F 16/313* (2019.01); *G06F 16/3335* (2019.01);
(Continued)

(58) Field of Classification Search
CPC .. G06N 5/041; G06N 16/353; G06N 16/3347; G06N 16/367; G06N 16/313; G06N 16/3335
See application file for complete search history.

(56) References Cited

U.S. PATENT DOCUMENTS 5,222,197 A 6/1993 Teng
5,544,280 A 8/1996 Liu
(Continued)

FOREIGN PATENT DOCUMENTS

WO 2008030884 3/2008

OTHER PUBLICATIONS

Donald Jones, "A taxonomy of Global Optimization Methods based on Response Surfaces", 2001 [Online] Downloaded Aug. 6, 2019 https://rd.springer.com/content/pdf/10. 1023%2FA%3A1012771025575. pdf (Year: 2001); 39 pages.
(Continued)

*Primary Examiner* — Hosain T Alam
(74) *Attorney, Agent, or Firm* — BLANK ROME LLP

(57) ABSTRACT

A hypotheses generation and event recognition system that enables event recognition by analyzing documents to construct one or more qualitative metrics (e.g., frequency of keywords, changes in sentiment, occurrence of ontological terms, evolution of topics, etc.), establishing a baseline for the qualitative metric(s), and outputting changes to that baseline for display. In aggregate, those qualitative metrics comprise temporal and/or spatial signals that, when combined, define signatures of events of interest. Accordingly, the user and/or the system may identify an event of interest based on the change in baseline. The system may further provide functionality to generate hypotheses by coding data according to an ontology, populating an ontology space, and using an optimization algorithm to rank points or neighbor- (Continued)

hoods in the coded ontology space. The system may further store links between ontological terms and qualitative metrics to provide functionality to test generated hypotheses that include those linked ontological terms.

20 Claims, 11 Drawing Sheets

Related U.S. Application Data

(60) Provisional application No. 62/736,717, filed on Sep. 26, 2018, provisional application No. 62/678,641, filed on May 31, 2018.

(51) Int. Cl.
*G06F 16/3332* (2025.01)
*G06F 16/334* (2025.01)
*G06F 16/353* (2025.01)
*G06F 16/36* (2019.01)

(52) U.S. Cl.
CPC ........ *G06F 16/3347* (2019.01); *G06F 16/353* (2019.01); *G06F 16/367* (2019.01)

(56) References Cited

U.S. PATENT DOCUMENTS 5,892,900 A 4/1999 Ginter
6,055,634 A 4/2000 Severwright
6,292,898 B1 9/2001 Sutherland
6,523,026 B1 2/2003 Gillis
6,571,227 B1 5/2003 Agrafiotis
6,792,419 B1 9/2004 Raghavan
7,093,139 B2 8/2006 Silverbrook
7,210,009 B2 4/2007 Gulick
7,292,960 B1 11/2007 Srinivasa
8,214,913 B2 7/2012 Chung
8,635,672 B2 1/2014 Yamada
9,361,676 B2 6/2016 Parker
9,525,802 B2 12/2016 Frieder
9,667,514 B1 5/2017 Wagner, Jr.
9,996,662 B1 6/2018 Florissi
10,002,034 B2 6/2018 Li
10,459,849 B1 10/2019 Shorb
10,521,727 B2 12/2019 Frieder
10,621,379 B1 4/2020 Kim
10,970,423 B2 4/2021 Soffer
11,106,878 B2 8/2021 Frieder
11,188,668 B2 11/2021 Hubert
11,210,424 B1 12/2021 Dakic
11,328,069 B2 5/2022 Le Gargean
11,379,860 B2 7/2022 Pathare
11,681,965 B2 6/2023 Hartley
2002/0159229 A1 10/2002 Searby
2002/0173971 A1 11/2002 Stirpe
2003/0212649 A1 11/2003 Denesuk
2005/0213295 A1 9/2005 Perez
2005/0256997 A1 11/2005 Koren
2006/0080554 A1 4/2006 McDonald
2009/0031095 A1 1/2009 Merry, Jr.
2009/0183011 A1 7/2009 Martin
2009/0187525 A1 7/2009 Agrawal
2010/0157528 A1 6/2010 Schmitt
2010/0228731 A1 9/2010 Gollapudi
2012/0096042 A1 4/2012 Brockett
2012/0179421 A1 7/2012 Dasgupta
2013/0238356 A1 9/2013 Torii
2014/0096249 A1 4/2014 Dupont
2014/0187173 A1 7/2014 Partee
2015/0058344 A1 2/2015 Bhatia
2015/0213109 A1 7/2015 Kassko
2015/0235049 A1 8/2015 Cohen
2015/0235138 A1* 8/2015 Frieder .................. G06N 5/041 706/46
2015/0294257 A1* 10/2015 Raza ................ G06Q 10/06398 705/7.42
2015/0356101 A1 12/2015 Cohen
2016/0034217 A1 2/2016 Kim
2016/0170814 A1 6/2016 Li
2016/0358087 A1 12/2016 Frieder
2017/0075877 A1 3/2017 Lepeltier
2017/0270425 A1 9/2017 Danson
2017/0300340 A1 10/2017 Ellis, II
2018/0288049 A1 10/2018 Donlan
2018/0336256 A1 11/2018 Li
2018/0337948 A1 11/2018 Chu
2019/0095657 A1 3/2019 Norton
2019/0114078 A1 4/2019 Oh
2019/0130135 A1 5/2019 Park
2019/0272162 A1 9/2019 Couillard
2019/0303118 A1 10/2019 Avinash Dorle
2019/0370114 A1 12/2019 Troia
2020/0099658 A1 3/2020 Couillard
2020/0311304 A1 10/2020 Parthasarathy
2020/0357059 A1 11/2020 Kennedy
2021/0050116 A1 2/2021 Sabeti
2021/0119765 A1 4/2021 Jankly
2021/0181986 A1 6/2021 Lee
2021/0195596 A1 6/2021 Mcfarlane
2022/0045842 A1 2/2022 Shi
2022/0222372 A1 7/2022 Larson
2022/0261668 A1 8/2022 Stumpe

OTHER PUBLICATIONS

"On Some Feature Selection Strategies for Spam Filter Design", Ren Wang, Amr. M Yousseff, Ahmed K. Elhakee, Electrical and Computer Engineering. CCECE '06. Canadian Conference on May 7-10, 2006; pp. 2155-2158.

Manzup "Array, Vector and Stack Data Structures for Absolute Beginners" Verified by wayback machine to Mar. 2013. [Online] Downloaded https://web.archive.org/web/20130428200256/https://www.go4expert.com/articles/array-vector-stack-data-structures-t27921; 8 pages.

International Search Report and Written Opinion dated Jan. 15, 2020; International Application No. PCT/US19/58167; International Filing Date: Oct. 25, 2019; 15 pages.

Metal-Oxide-Semiconductor_(MOS)_Fundamentals (Year: 2022).

Hartley et al., Landscape of international event-based biosurveillance, Emerg Health Threats, Feb. 19, 2010, https://pubmed.ncbi.nlm.nih.gov/22460393/.

Parker, et al., A framework for detecting public health trends with Twitter, Proceedings of the 2013 IEEE/ACM International Conference on Advances in Social Networks Analysis and Mining, Aug. 25, 2013, https://dl.acm.org/doi/10.1145/2492517.2492544.

Konak, Abdullah, David Coit, and Alice Smith. "Multi-objective optimization using genetic algorithms: A Tutorial" 2005 [ONLINE] Downloaded Nov. 6, 2024 hhttps://www.eng.auburn.edu/~aesmith/files/Multi-objective%20optimization%20using%20genetic% 20algorithms.pdf (Year: 2005).

International Search Report and Written Opinion dated Aug. 19, 2019; International Application No. PCT/US2019/034824; International Filing Date: May 31, 2019; 10 pages.

Gerald Whitaker et al.; "A hybrid genetic algorithm for multiobjective problems with activity analysis-based local search"; 2009 [online]; Downloaded Aug. 6, 2019; https://pubag.nal.usda.gov/download/22943/PDF (Year: 2009).

Dinarelli; Marco, Hypothesis Selection for Re-ranking Semantic Annotations, Dec. 1, 2010, 2010 IEEE Spoken Language Technology Workshop (2010, pp. 407-411) (Year: 2010).

Chen; Qingyu, Artificial Intelligence (AI) in Action: Addressing the COVID-19 Pandemic with Natural Language Processing (NLP), Jan. 3, 2021, arXiv, Computation and Language (Year: 2021).

* cited by examiner

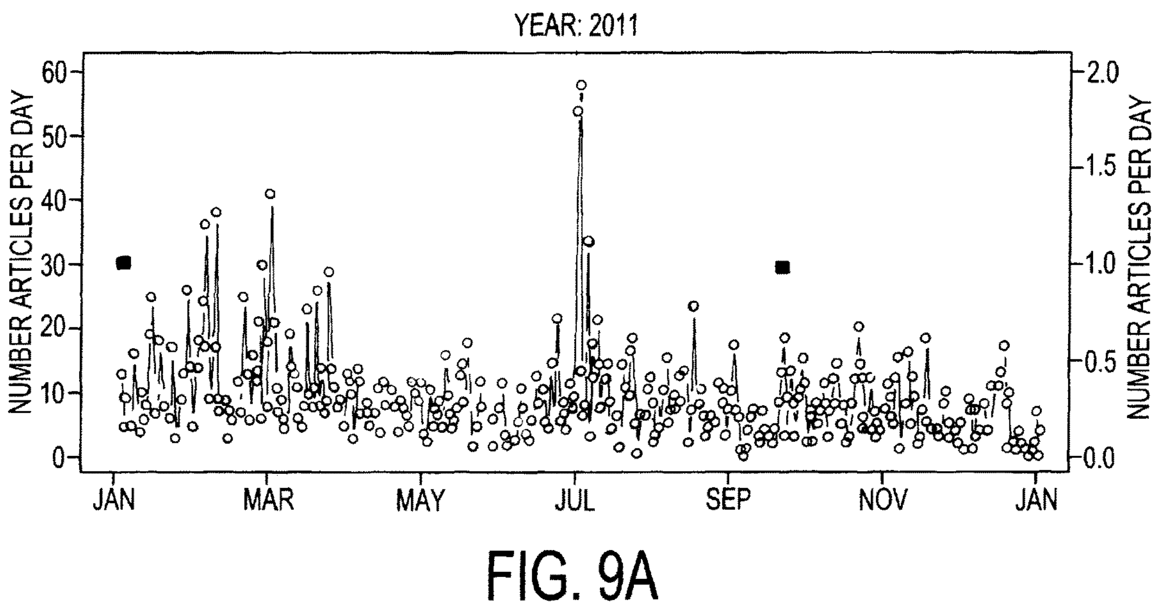
FIG. 9A
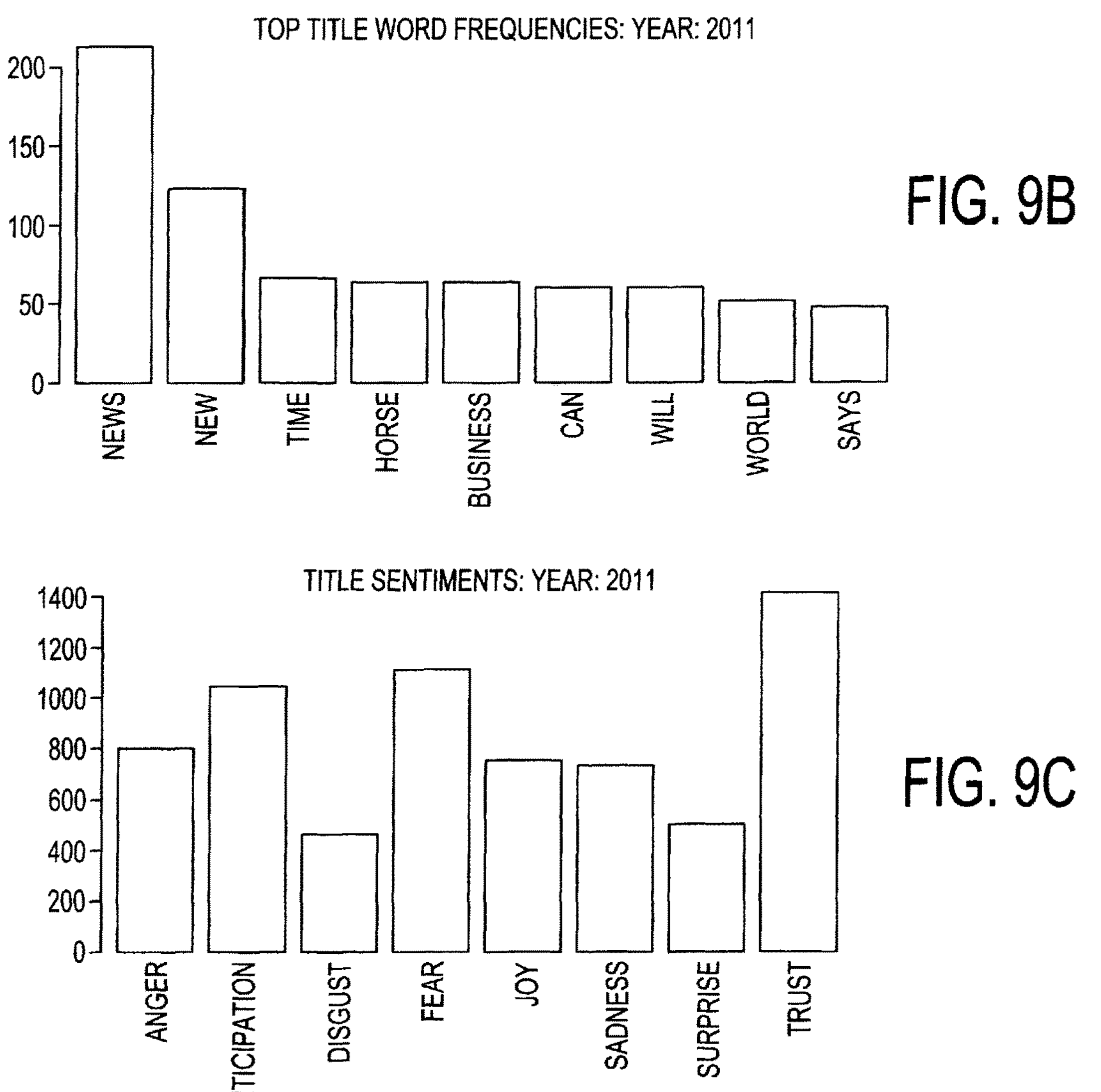
FIG. 9B
FIG. 9C

GENERATING HYPOTHESES AND RECOGNIZING EVENTS IN DATA SETS

CROSS-REFERENCE TO RELATED APPLICATIONS

This application is a Continuation of U.S. patent application Ser. No. 17/059,985, filed Nov. 30, 2020, which is a National Stage entry of PCT/US2019/034824, filed May 31, 2019, which claims priority to U.S. Prov. Pat. Appl. No. 62/736,717, filed Sep. 26, 2018, and U.S. Prov. Pat. Appl. No. 62/678,641, filed May 31, 2018. This application is also related to U.S. patent application Ser. No. 14/597,652, filed Jan. 15, 2015, which issued as U.S. Pat. No. 10,521,727 on Dec. 11, 2019, and U.S. application Ser. No. 15/242,325, filed Aug. 9, 2016, which issued as U.S. Pat. No. 11,106,878 on Aug. 11, 2021. The entire contents of the aforementioned patent applications are hereby incorporated by reference.

FEDERAL FUNDING

None

BACKGROUND

The systematic monitoring of "big data" to gain robust understanding within a particular domain is a pillar of modern commerce, research, security, health care, and other fields. Governments and other organizations seek situational awareness, real-time indications and warning, and short- to long-term forecasting. If properly analyzed, even publicly-available open source data (that is seemingly benign) can be used to identify leading indicators of events of interest to those governments and organizations. Additionally, organizations may have access to proprietary information that, if properly analyzed, can offer insight into the domain of the organization. However, the total amount of digital information publicly available on global networks is increasing exponentially and cannot be manually reviewed, even by a large group of humans, to quickly identify all relevant data for a given subject or project.

The demand for processing large volumes of digital data in real time is particularly heightened in the area of national security. Agencies faced with ongoing digital and physical threats from various parts of the world are tasked with warning communities before an attack, implementing emergency preparedness, securing borders and transportation arteries, protecting critical infrastructure and key assets, and defending against catastrophic terrorism. Similar demands also exist in other surveillance areas, including natural disasters, humanitarian emergencies, public health events, public opinion, consumer product issues, and morale.

An agency's capability to detect potential events early on and monitor such plots continuously before they are carried out is most critical. The data on global networks can potentially give information-seeking organizations all the information they need. The key question is how to effectively and carefully sort and search vast amounts of data.

The conventional approach to identifying events of interest is to examine data or streams of data for keywords related to claim topics of interest. When relevant documents are detected (e.g., by Boolean keyword searches, logistic regression, and/or Bayesian or other classifiers), they are then made available to human analysts, who examine the resulting corpus of retrieved material and form interpretations. Another common approach is to monitor a numerical variable (e.g., temperature, rainfall, number of inspection alerts, etc.) for anomalies and, when an anomaly is found or thought to be found, focus additional scrutiny or possibly undertake an investigation looking for a potential event.

While these conventional methods are the norms, they are often inefficient. They are often done on an ad hoc basis once an event (for example, a food safety event) has been discovered or hypothesized. Accordingly, they run the risk of not identifying surprises since, by definition, surprises do not occur frequently and are therefore unlikely to be considered as an interpretation of observed data. For example, keyword searches look for something specific, machine classifiers are trained on the familiar, and logistic regression looks for risk factors of predefined, desired outcomes. Similarly, monitoring numerical variables that are "born digital" (e.g., meteorological factors from sensors or counts of tests failed at inspection centers) can be limited in terms of sensitivity and specificity and may or may not be appropriate for the gamut of events of interest.

Data for food event surveillance, for example, are generally drawn from many sources. The providence of those data (who produced the data, how were they measured, and the path the data took between production and acquisition) must be understood so that limitations and bias can be assessed (and estimated if possible). How data are cleaned (i.e., prepared for machine analysis) and how they are processed can introduce further error and bias, which must be understood if results are to be interpreted correctly. Methods centered on data not born digitally (or data of unknown or questionable providence or data that are not cleaned according to a consistent methodology) produce results that can be unclear if assumptions regarding the data are made that are not documented, normally explored, or defensible.

Accordingly, there is a need for an improved system to identify relevant hypotheses in data, including surprising hypotheses, and to recognize known and emergent event signatures and enable human and/or machine event recognition of food safety and related events.

SUMMARY

To overcome those and other drawbacks in the prior art, a hypotheses generation and event recognition system is provided.

The system enables human and/or machine event recognition by analyzing documents to construct one or more qualitative metrics, establishing a baseline for the qualitative metric(s), identifying additional documents over time, identifying an updated baseline, and outputting the adjusted baseline for display to the user. Accordingly, the user and/or the system may identify an event of interest based on the change in baseline. The qualitative metrics may include the frequency of keywords in time-stamped documents, the change in sentiment or emotions expressed in time-stamped documents, the occurrence of ontological terms from a user-supplied ontology, evolution of topics in the data, etc. In aggregate, these and related metrics comprise temporal and/or spatial signals that, when combined, define signatures of events of interest.

Additionally, the system may identify hypotheses by receiving an ontology (including a plurality of elements, each including a plurality of ontological terms, where the ontology defines ontological vectors comprising an ontological term from each of two or more of the plurality of elements, and each ontological vector describes a hypothesis), coding the documents according to the ontology to identify ontological vectors, forming an ontology space (where each dimension of the ontology space comprises one of the elements of the ontology), populating the ontology space by adding the ontological vectors identified in the documents (such that the weight of each point in the ontology space is proportional to the number of ontological vectors associated with that point found in the documents), using an optimization algorithm to rank points or clusters of points in the ontology space based on the weights of the points or the clusters of points, and outputting the ranked list of points or clusters of points (each point or cluster of points corresponding to one or more ontological vectors describing a hypothesis).

Finally, the system may store links between ontological terms and qualitative metrics to provide functionality to test generated hypotheses that include those linked ontological terms.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein:

FIGS. 9A, 9B, and 9C are graphs illustrating baseline signals according to an exemplary embodiment of the present invention;

DETAILED DESCRIPTION

Figure 1:
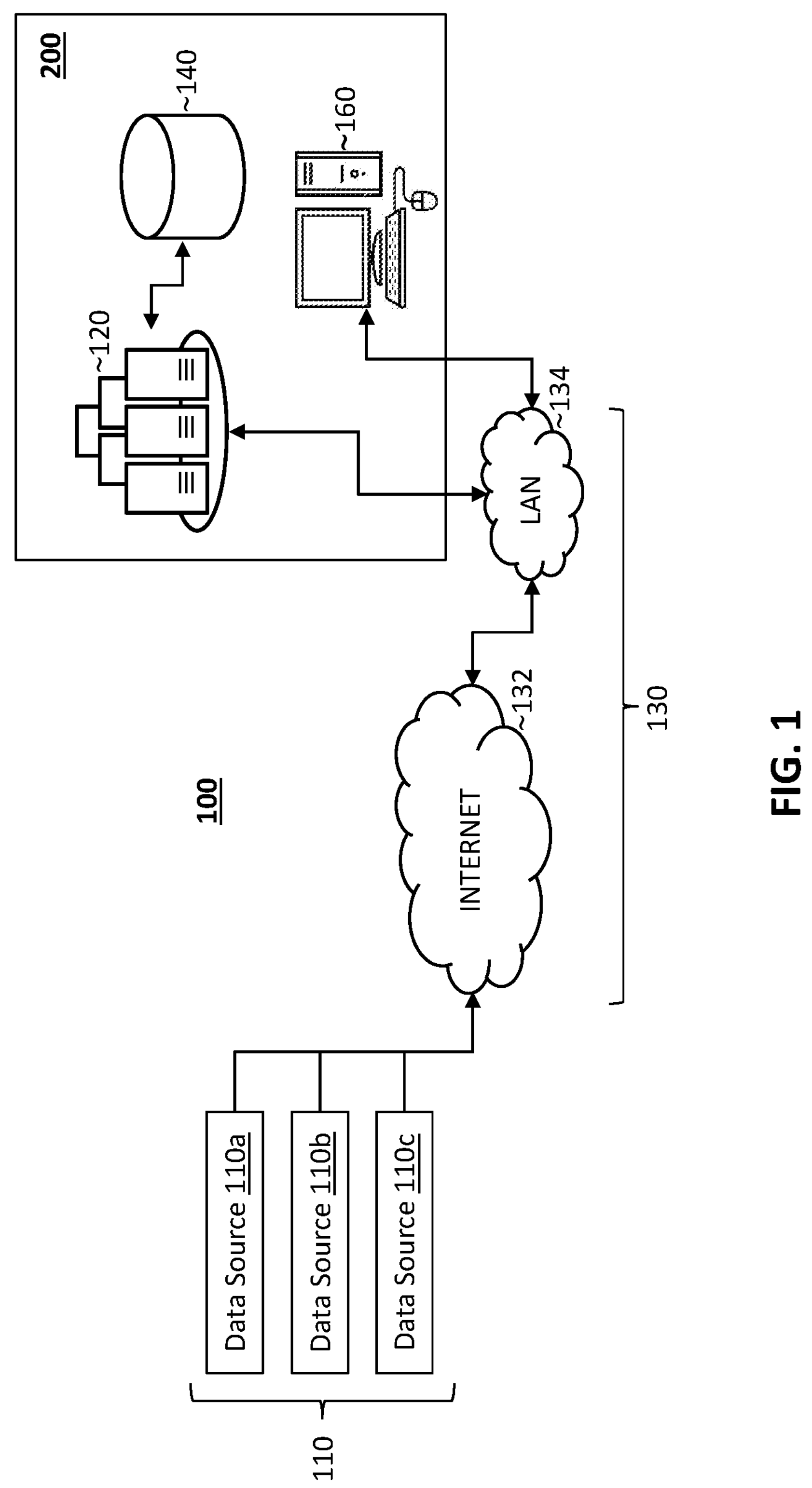
FIG. 1 is a block diagram of an architecture of a hypotheses generation and event recognition system according to an exemplary embodiment of the present invention.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 of a hypotheses generation and event recognition system 200 according to an exemplary embodiment.

As shown in FIG. 1, the architecture 100 includes one or more servers 120, a non-transitory storage media 140, and one or more client devices 160 that are electrically connected to one or more data sources 110 via one or more networks 130. The networks 130 may include a wide area network 132, such as the Internet, a local area network 134, etc.

The data sources 110 may include any digital or non-digital medium data source, whether public or private. The non-transitory storage media 140 may include any hardware storage medium, such as a hard disk, solid-state memory, etc. The one or more servers 120 may include any suitable computing device that executes instructions to perform the functions described herein. The one or more client devices 160 may include any suitable computing device (such as a personal computer) that executes instructions to send and receive data to/from the one or more servers 120 and provides a graphical user interface to receive instructions from a user and display information to that user. Both the server(s) 120 and the client device(s) 160 each include internal non-transitory storage media and at least one hardware computer processor. The server(s) 120, the storage media 140, and the client device(s) 160 may be co-located or remotely located from each other. The network(s) 130 may include one or more short- or long-range data connections that enable the one or more servers 120 to receive and store information output by the data source(s) 110. The network(s) 130 may include wired and/or wireless data connections.

The system 200 described below includes the one or more servers 120, the non-transitory storage media 140, and the one or more client devices 160.

Figure 2:
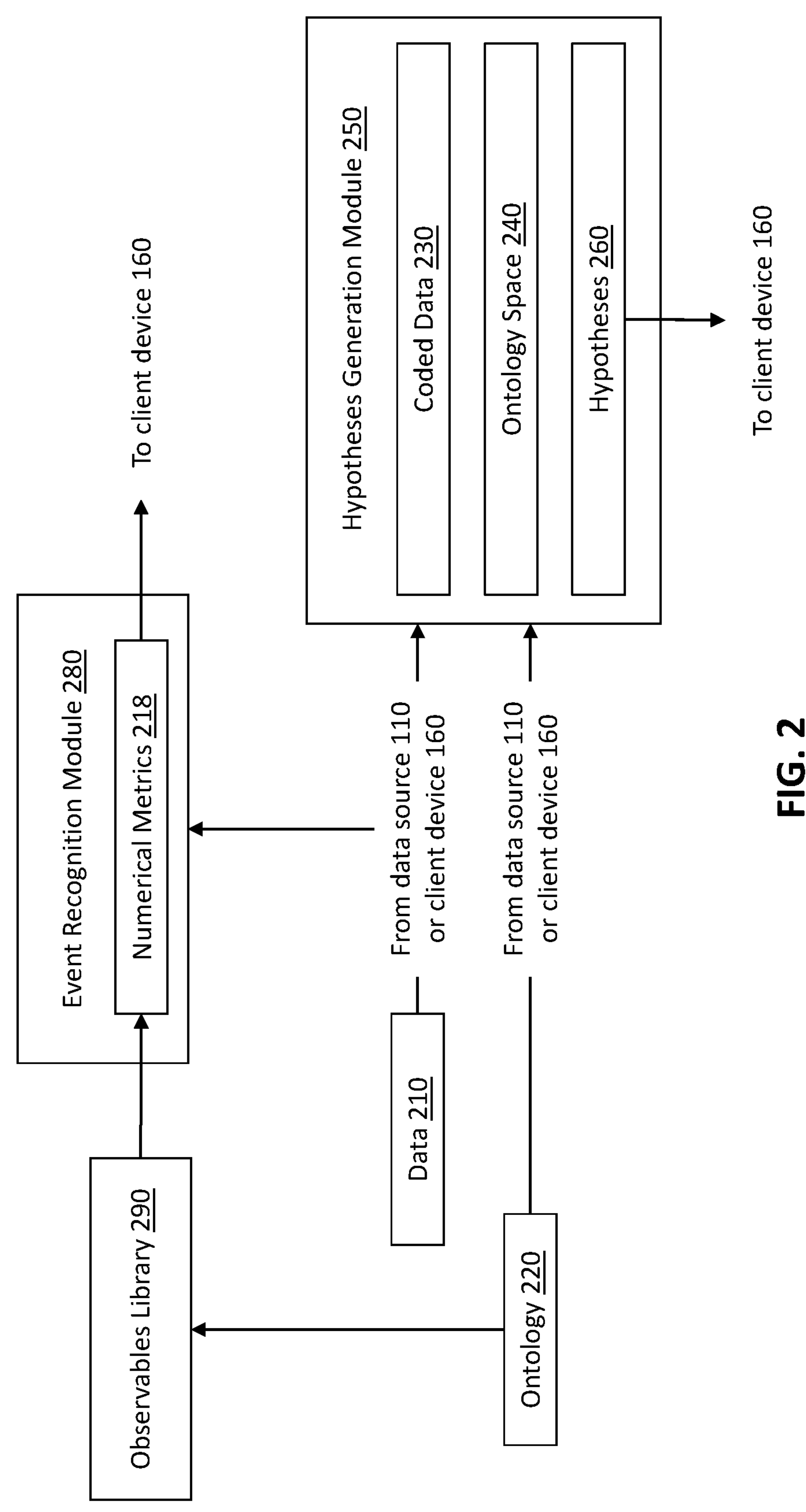
FIG. 2 is a block diagram of software modules of the hypotheses generation and event recognition system and the flow of data to and from those software modules according to an exemplary embodiment of the present invention.

FIG. 2 is a block diagram of the software modules of the hypotheses generation and event recognition system 200 and the flow of data to and from each of those software modules according to an exemplary embodiment of the present invention.

As shown in FIG. 2, the system 200 may include a hypotheses generation module 250 and an event recognition module 280. Each of the modules 250 and 280 may be embodied by software instructions stored on non-transitory media and executed by a hardware processor of a hardware computing device (e.g., the server(s) 120). The system 200 may also include an optional observables library 290 stored on non-transitory media (e.g., storage media 140).

Data 210 may be downloaded from an external data source 110 (via one or more networks 130) or uploaded via a client device 160. Similarly, an ontology 220 may be downloaded from an external data source 110 (via one or more networks 130) or uploaded via a client device 160. As described in detail below with reference to FIG. 3, the hypotheses generation module 250 generates hypotheses 260 for transmittal to a client device 160 by generating coded data 230, populating an ontology space 240, and identifying and ranking hypotheses 260 found in the ontology space 240. As described in detail with reference to FIGS. 4-11, the event recognition module 280 extracts numerical metrics 218 from the data 210 and plots changes in those numerical metrics 218 and outputs those changes to a client device 160.

Hypotheses Generation

Figure 3:
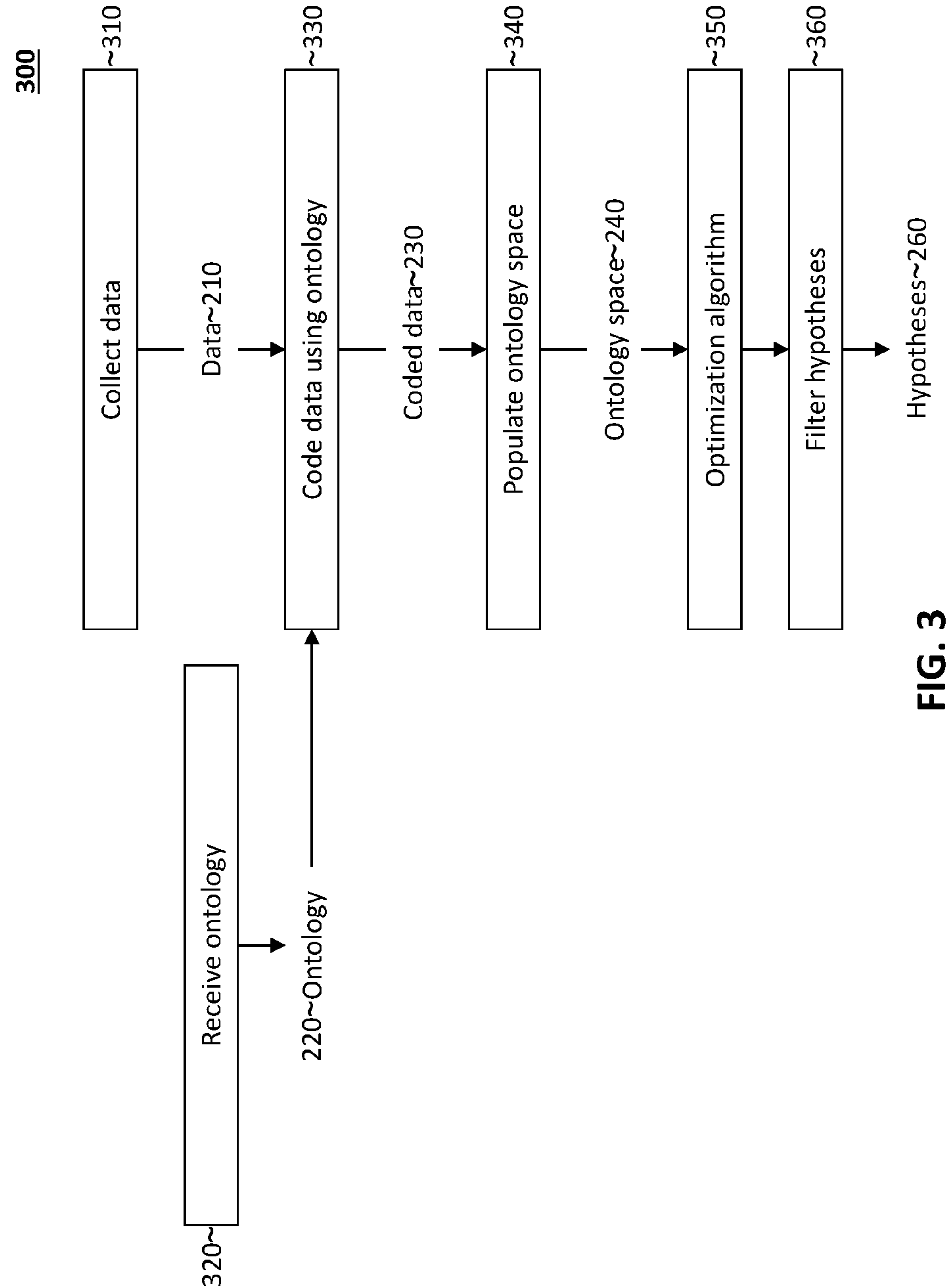
FIG. 3 is a flow chart illustrating a hypotheses generation process according to an exemplary embodiment of the present invention.

FIG. 3 is a flow chart illustrating a hypotheses generation process 300 according to an exemplary embodiment of the present invention. The hypotheses generation process 300 may be performed, for example, by the hypotheses generation module 250 of the server 120.

Data 210 are collected in step 310. The corpus of data 210 may include any collection of available data sets that may be related to a group, a time period, a political campaign, an economic interest, a personal preference, a geographic area, a social class, a past/future event, etc. The data 210 may include, for example, news articles, emails, metadata, phone records, text messages, account information, social network postings and activities, online comments, purchase orders, blogs, Global Position System (GPS) data, files shared with the public or friends, friend lists in social platforms, etc. The data 210 may be transferred from one or more data sources 110 via the one or more networks 130. Alternatively, the data 210 may be obtained by scanning newspaper articles, printed reports, archived files, books, personal records, etc. The data 210 may also include structured data, such as transaction logs. The data 210 may be stored in its original form or may be re-organized. The data may be native in digital form (i.e., created digitally) or may have been digitized either with or without enhancement (for example, using the enhancement techniques disclosed in U.S. Pat. Nos. 9,361,676 and 9,525,802, which are hereby incorporated by reference).

As described in more detail below, the data 210 may be relevant to a particular domain of interest, such as food adulteration. However, the system 200 provides a domain agnostic platform that can utilize any domain-specific or generic data 210.

The data 210 may be publicly accessible information, such as news reports (for example, downloaded from one or more of the data sources 110). Additionally or alternatively, the system 200 may provide a platform for those with access to proprietary information to analyze that proprietary information. In those embodiments, the data 210 may include proprietary information (for example, downloaded with permission via the one or more networks 130 or imported via a client device 160).

Each document in the data 210 may be weighted. While all of the data 210 may be of interest, some of the data 210 may have different associated weights depending on characteristics such as the nature, source of capture, volume, uniqueness, and variance of the data 210. As such, some documents in the data 210 may be treated as being more valuable than others.

An ontology 220 is received in step 320. An ontology 220 is a set of possible event descriptions. That ontology can be understood to represent a formal conceptualization of a particular domain of interests or a definition of an abstract view of a world a user desires to present. Such conceptualization or abstraction is used to provide a complete or comprehensive description of events, interests, or preferences from the perspective of a user who tries to understand and analyze a body of information.

Each ontology 220 includes a number of elements. An ontology 220 with three elements, such as (subject, verb, object) for example, is used to detect all data corresponding to the notion "who did what to whom." A 6-element ontology 220 may include (what, who, where, indicators, actions, consequences). Each element includes choices of terms for that element of the ontology 220, known as a "vocabulary." If each element in a 6-element ontology 220 has a 100-term vocabulary, for example, then the ontology 220 defines $100^6$ descriptions of distinct, mutually exclusive (although possibly related) events. Accordingly, the ontology 220 constitutes the set of all distinct combinations of hypotheses considered during the hypotheses generation process 300. Each combination of elements in an ontology 220 is referred to as a "vector."

For many vocabulary terms, synonyms exist that refer to the same real-world concept. Accordingly, the ontology 220 may include synonym collections that each correspond to one of the vocabulary terms.

The ontology 220 may be specific to a particular domain, such as a food adulteration. Accordingly, a subject matter expert (SME) preferably vets the ontology 220 to ensure that it accurately represents the domain knowledge of the data 210 under consideration. However, the system 200 provides a domain agnostic platform that can use any number of domain-specific or generic ontologies 220 to analyze any set of data 210. The ontology 220 may be downloaded by the server 120 via the one or more networks 130 or input via a client device 160.

The data 210 are coded using the ontology 220 to form coded data 230 at step 330. The server 120 searches the documents in the data 210 to determine which ontology vectors in the ontology 220 appear in the data 210. For example, an analysis of reports on political violence using a 3-element (subject, verb, object) ontology 220 may identify the following ontology vectors representing the following hypotheses:

1. Terrorists sabotage canned food factory.
2. ISIS opens valve at peach canning factory.
3. Maintenance finds malfunctioning valve in peach canning factory.

Accordingly, the server 120 assigns vectors from the ontology 220 to corresponding elements of text in the data 210 to form the coded data 230. The server 120 may code the documents in the data 210 using one or more entity extraction schemes that are known in the art. Additionally, the server 120 may provide a platform for one or more human analysts to check the machine encoded documents in the data 210 and modify the machine encoding (e.g., via one or more client devices 160).

The ontology 220 can be graphically represented as an ontology space 240, for example with as many dimensions as there are elements in the ontology 220. The ontological vectors identified in the data 210 form an ontology space 240 at step 340. A one-element ontology 220, for example, forms an ontology space 240 with only one dimension (i.e., a line), which is readily understandable by a human analyst. Each point along the line represents a vocabulary term in the ontology 220. It can be imagined that each time a vocabulary term is identified in the data 210, a bar graph at that point along the line gets higher (or lower). The vocabulary terms found most often in the data 210 are represented by the highest peaks (or lowest troughs) along the one-dimensional ontology space 240. Two-element and three-element ontologies 220 may form two-dimensional and three-dimensional ontology spaces 240, which are more complicated but may still be visualized and comprehended by an analyst. However, when the ontology 220 has more than three elements and forms a 4-dimensional, 5-dimensional, or even 100-dimensional ontology space 240, the ontology space 240 becomes so complex that no human analyst could ever intuitively understand it.

Regions of the ontology space 240 are populated as the documents in the data 210 are coded. The populated ontology space 240 is a geometric representation of possible events that are encoded by that particular corpus of data 210 according to that ontology 220. The vectors identified in the data 210, which are assigned to the corresponding coordinates in the ontology space 240, form structures in the ontology space 240. In particular, points in the ontology space 240 that are populated by successive occurrences in the data 210 are assigned a value corresponding to a larger weight (described above as a higher peak or lower trough) than points in the ontology space 240 that are found less often in the data 210. When all documents are coded, the ontology space 240 is populated by clusters (i.e., neighborhoods of points) of differing weights. The clusters of points of highest weight in the ontology space 240 correspond to the most likely hypotheses of what the data 210 are describing.

As described above, an ontology 220 with N elements may be depicted graphically in an N-dimensional ontology space 240, where each dimension of the N-dimensional ontology space 240 represents one of the N elements of the ontology 220. In other embodiments, however, the hypotheses generation module 250 may perform dimension reduction such that the ontology space 240 has fewer dimensions than the number of elements in the ontology. As described in U.S. patent application Ser. Nos. 14/597,652 and 15/242,325, for example, the hypotheses generation module 250 can separate the N elements of the ontology 220 into R groups and then depict them graphically in the coded data 230 in an R-dimensional ontology space 240.

The hypotheses generation module 250 may also group or merge ontology vectors describing similar or related concepts into neighborhoods in the ontology space 240 as described in U.S. patent application Ser. Nos. 14/597,652 and 15/242,325. For example, the hypotheses generation module 250 may identify ontology vectors that describe similar or related concepts—for example, {group, bombed, bunker} and {group, exploded, bunker}—that are not distinct events based on security interests. If the ontology 220 is ordered, meaning similar or related choices for each ontology element appear in order, the similar or related ontology vectors in the coded data will appear close together in the ontology space 240. Accordingly, the hypotheses generation module 250 may merge ontology vectors using clustering techniques that are known in the art, such as hierarchies, filters/thresholds, topic models, and conditional random fields.

An optimization algorithm identifies and ranks hypotheses 260 at step 350. The server identifies and ranks the hypotheses 260 by identifying the clusters of highest weights in the ontology space 240. Identifying this set of clusters in the ontology space 240 is not a trivial problem for ontologies 220 of significant size and structure. However, it is a moderately well-defined optimization problem that can be solved using optimization algorithms such as simulated annealing, a Monte Carlo-based algorithm, genetic algorithm, etc.

Simulated annealing, for example, identifies the highest weighted clusters in an efficient and robust manner by selecting a random point in the ontology space 240 and letting simulated annealing govern a random "walk" through the weighted ontology space 240 via a large number of heat-cooling cycles. The server 120 builds up an ensemble of such cycles for a large number of randomly-chosen initial points. An accounting of the most highly weighted regions in the weighted ontology space 240 then corresponds to a ranked list of the hypotheses 260 that potentially explain the material in the data 210, which may be presented to an analyst (e.g., via a client device 160) to test. In another example, the ontology space 240 can graphically depict populations and a genetic algorithm can be used to identify and rank the highest weighted ontology vectors or neighborhoods in terms of fitness of population.

Optionally, the hypotheses 260 are filtered at step 360 to generate a set of ranked relevant hypotheses 260.

Trivial hypotheses (such as tautologies) and/or nonsensical hypotheses may be discarded. A hypothesis 260 that only contains frequent words, for example, is most likely too general to be of interest. Meanwhile, a hypothesis 260 containing the action "consumer eats delivery truck laced with poison" would be nonsensical and would also be discarded. By contrast, "consumer eats strawberries laced with poison" is of interest. Similarly, the specificity of "consumer eats strawberries laced with poison" is more interesting (and actionable) than "consumer eats produce laced with poison". The server 120 may use techniques from information retrieval and natural language procession (e.g., term frequency, scope and synonym analysis, etc.) to discard trial and/or nonsensical hypotheses.

The system 200 may also provide functionality for users to filter results according to topics of interest (e.g., via a client device 160). For example, if the user is concerned with developing hypotheses related to strawberries (as opposed to cardboard boxes, for example), then the system 200 provides functionality to exclude hypotheses that are not related to strawberries or materials in the farm-to-fork pathway related to strawberry growth, production, and delivery. Specifically, the hypotheses generation module 250 may identify regions of the ontology space 240 that include ontology element choices that are of interest to the user (e.g., strawberries). Ontology vectors or neighborhoods that are not located within the ontology space 240 near the area of interest of the user may be filtered out as uninteresting to the user. Conversely, ontology vectors or neighborhoods squarely within the region of interest of the user may actually be trivial to the user. In additional to functionality for a user to manually specify a topic of interest, the system 200 may provide functionality to automatically determine topics of interest, for example based on previous hypotheses, the user's role (individually or as a group), topic models, or other information retrieval approaches known in the art.

Once a set of candidate hypotheses 260 is generated, clustering them may introduce larger ontologies 220 or themes. In other words, unexpected themes, potentially hierarchically organized, may be detected. Accordingly, the server 120 may identify and label derived themes from the hypotheses 260, for example using topic models or conditional random field-based approaches.

Event Recognition

In addition to identifying hypotheses 260 that users may not have previously considered, the system 200 also includes an event recognition module 280 that enables human and/or machine event recognition.

The event recognition module 280 analyzes documents from the data 210 and constructs one or more numerical metrics 218 using text analytic and other methods. The documents that are analyzed may be selected by the user as relevant to particular topic of interest. For example, to analyze food integrity, the user may have the event recognition module 280 analyze meteorological bulletins, epidemiological bulletins, and agricultural reports.

The metrics 218 may include, for example, the frequency of keywords in time-stamped documents, the change in sentiment or emotions expressed in time-stamped documents, the occurrence of ontological terms from a user-supplied ontology, evolution of topics in the data 210, etc. In aggregate, these and related metrics 218 comprise temporal and/or spatial signals that, when combined, define signatures of events of interest.

Frequency of keywords: The user may supply a list of keywords of interest (e.g., strawberries, Costa Rica, rainfall, flooding). The event recognition module 280 may then search for and count the numbers of each keyword (or combinations of keywords) per unit of time (e.g., hour, day, week, etc.), detect sudden changes in the occurrence of those keywords per unit time, count the occurrence of those keywords in publications from or focused on particular geographic regions, identify named places associated with those keywords, etc.

Change in sentiment and emotions: A user may be interested in changes in the sentiment or emotion expressed in documents reviewing or describing a particular product. For example, a sudden change in the sentiment regarding strawberries from Costa Rica from positive or neutral to negative may indicate changes in consumer satisfaction. The product may be making people sick or may be moldy or smell odd. Accordingly, the event recognition module 280 may compute the sentiment of documents containing terms of interest (e.g., user-supplied keywords, ontology terms) per unit of time and identify named places associated with sentiments.

Occurrence of terms from an ontology 220: As described above, an ontology 220 is a specification of related facts encapsulating knowledge about a given domain (for example, food integrity). Automated identification of terms in the ontology 220 may lead to recognizing information that may be otherwise missed if documents are reviewed manually. Accordingly, the event recognition module 280 may search for and count the occurrences of each ontology term, or combinations of terms, per unit of time (e.g., hour, day, week, etc.) and identify named places associated with those terms.

Evolution of topics: The emergence of documents clustered in time or in a specific geographic area and expressing themes related to a particular domain of interest (e.g., food safety issues) may be a direct indicator of an event of interest. Accordingly, the event recognition module 280 may compute themes and evaluate the distributions of themes in time and space.

The event recognition module 280 analyzes the documents in the data 210 to determine a baseline for each metric 218 (or aggregates of the metrics 218). Deviations from those baselines may be indicative of an event of interest in a particular domain (e.g., food integrity). Accordingly, the event recognition module 280 identifies deviations from those baselines and outputs information indicative of those deviations (e.g., alerts) to the user (e.g., via a client device 160).

Figure 4:
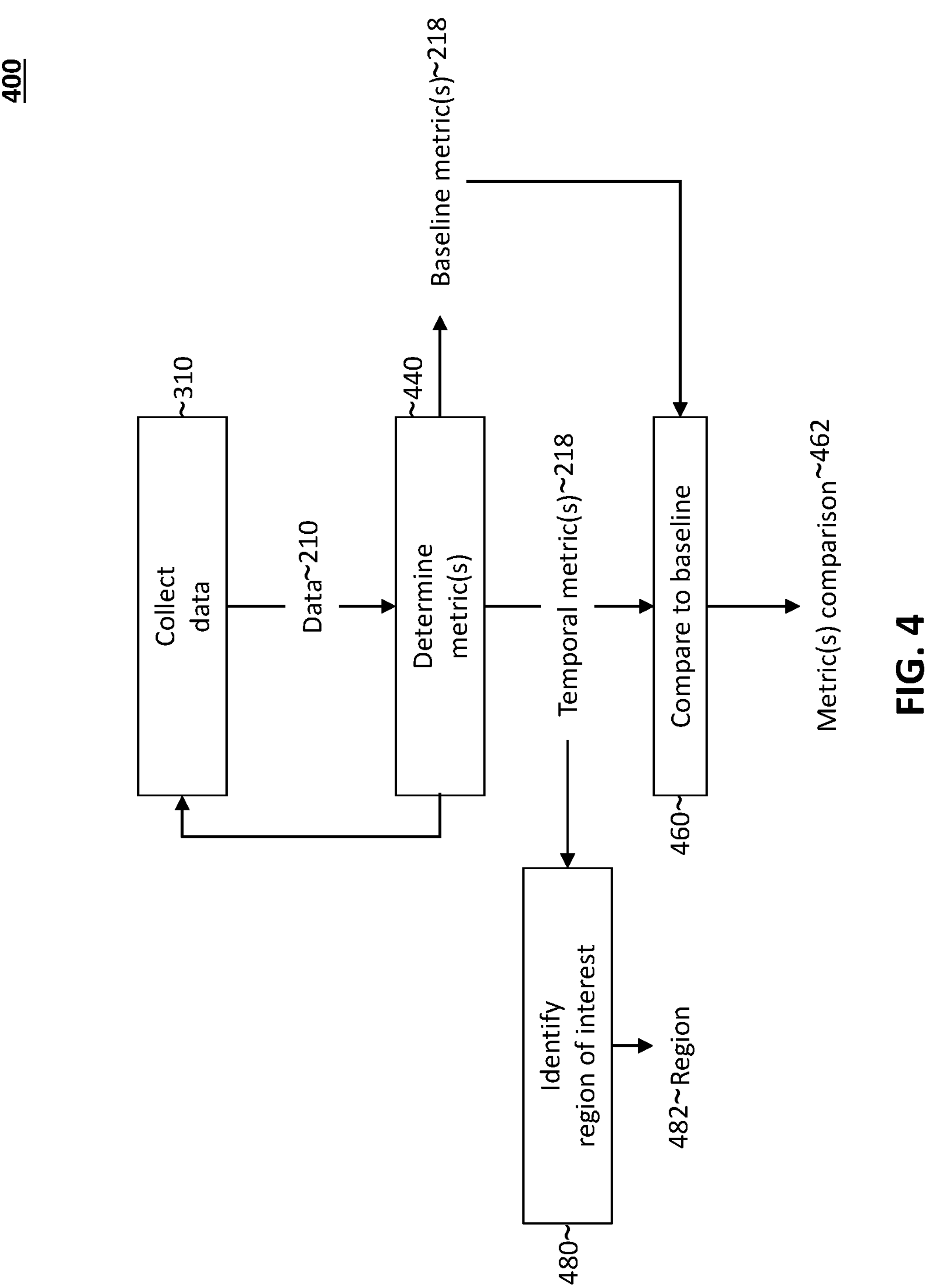
FIG. 4 is a flowchart illustrating an event recognition process according to an exemplary embodiment of the present invention.

FIG. 4 is a flowchart illustrating an event recognition process 400 according to an exemplary embodiment of the present invention. The event recognition process 400 may be performed, for example, by the event recognition module 280 of the server 120.

Data 210 are collected in step 310. Just like the data collection step 310 of the hypotheses generation process 300, the data 210 may be relevant to a particular domain of interest (such as food adulteration). However, the system 200 provides a domain agnostic platform that can utilize any domain-specific or generic data 210.

Documents in the data 210 are analyzed to determine one or more metrics 218 in step 440. One or more baseline metrics 218 are based on documents initially collected in step 310. Because steps 310 and 440 are recursive processes, step 310 is then repeated so that updated data 210 may be collected over time, and step 440 is repeated so that the same metric(s) (temporal metric(s) 218) are determined as updated data 210 are collected over time.

In step 460, the temporal metrics 218 are compared to the baseline metrics 218 to determine change(s) in the temporal metrics 218 relative to the baseline metrics 218 (the metric(s) comparison 462). The event recognition module 280 may output the metric(s) comparison 462 to the user (e.g., graphically as described below) via a remote device 160. Additionally or alternatively, the event recognition module 280 may generate and output an alert for a user in response to a determination that the metric(s) comparison 462 meets or exceeds a predetermined threshold.

A region of interest 482 may be identified in step 480. For example, the event recognition module 280 may determine that the temporal metric(s) 218 that exceed the baseline metrics 218 were found in publications from or focused on particular geographic regions. Additionally or alternatively, the event recognition module 280 may identify named places in the documents where the temporal metric(s) 218 exceed the baseline metrics 218 using an entity extraction scheme. In those instances, the event recognition module 280 may output the region of interest 482 to the user, together with the metric(s) comparison 462 or the alert generated based on the metric(s) comparison 462.

FIG. 4 describes the generic event recognition process 400 for identifying changes in any metric 218 found in the data 210. FIGS. 5-8 describe specific processes 500-800 in which the metric is keyword frequency, sentiment, frequency of ontological terms, or evolution of topics.

Figure 5:
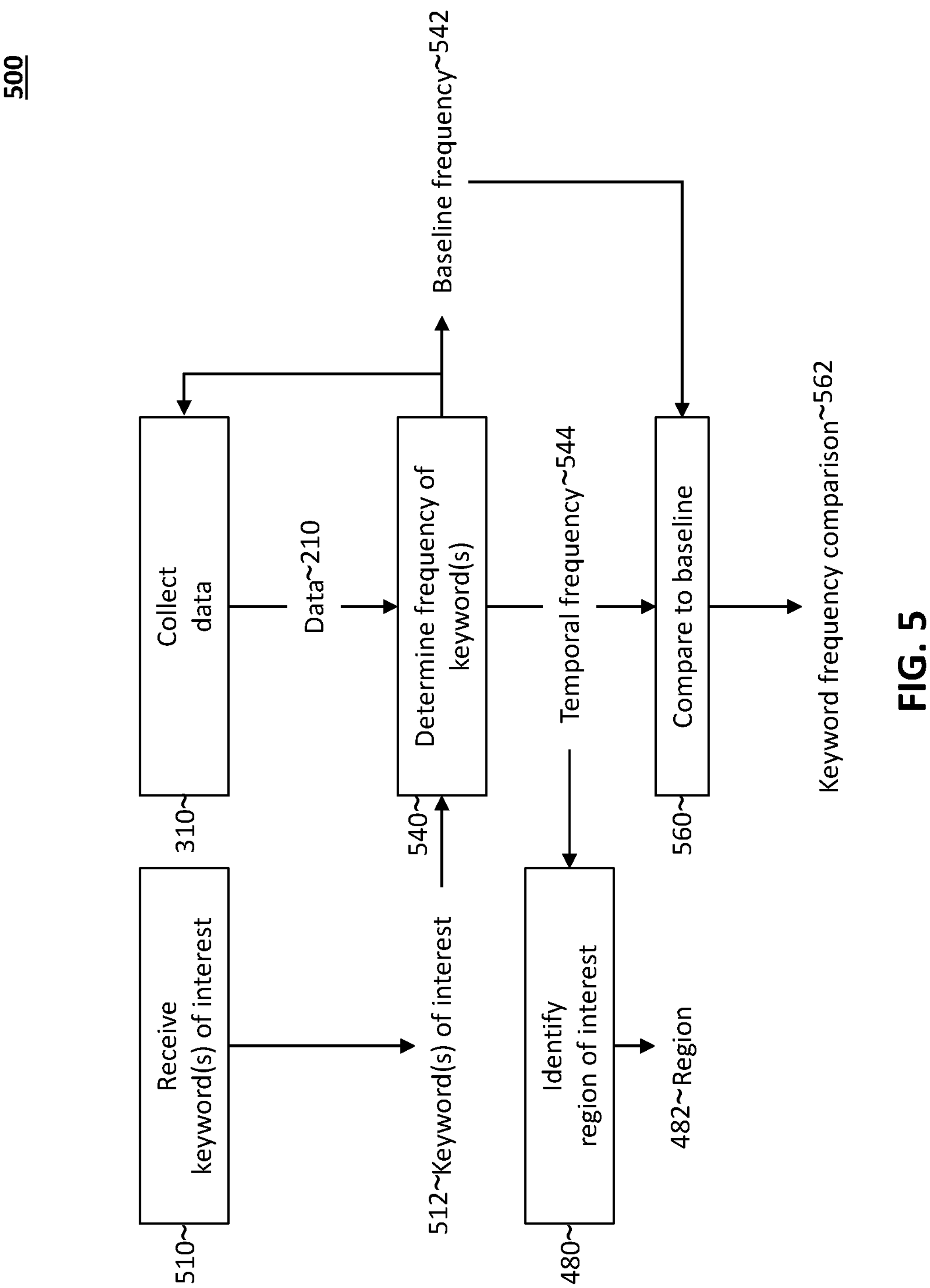
FIG. 5 is a flowchart illustrating a keyword frequency recognition process according to an exemplary embodiment of the present invention.

FIG. 5 is a flowchart illustrating a keyword frequency recognition process 500 (that may be performed, for example, by the event recognition module 280 of the server 120) according to an exemplary embodiment of the present invention.

Data 210 are collected in step 310. Again, while the system 200 provides a domain agnostic platform that can utilize any domain-specific or generic data 210, the data 210 may be relevant to a particular domain of interest (such as food adulteration).

One or more keywords of interest 512 are received from a user in step 510.

Documents in the data 210 are analyzed to determine the baseline frequency 542 of the one or more keywords 512 in step 540. Again, steps 310 and 540 are recursive processes, meaning that updated data 210 may be collected over time and the temporal frequency 544 of the keyword(s) 512 are determined over time. The event recognition module 280 may determine the baseline frequency 542 and the temporal frequency 544 of the keyword(s) 512 using an entity extraction scheme.

In step 560, the temporal frequency 544 is compared to the baseline frequency 542 to determine changes in the temporal frequency 544 of the keyword(s) 512 relative to the baseline frequency 542 of those keyword(s) 512 (the keyword frequency comparison 562). The event recognition module 280 may output the keyword frequency comparison 562 to the user (e.g., graphically) as described below. Additionally or alternatively, the event recognition module 280 may generate and output an alert for a user in response to a determination that the keyword frequency comparison 562 meets or exceeds a predetermined threshold.

Again, a region of interest 482 may be identified in step 480. Specifically, the event recognition module 280 may determine that documents in the data 210 where the temporal frequency 544 of the keyword(s) 512 exceed the baseline frequency 542 of those keyword(s) 512 were found in publications from or focused on particular geographic regions. Additionally or alternatively, the event recognition module 280 may identify named places in the documents where the temporal frequency 544 of the keyword(s) 512 exceed the baseline frequency 542 of those keyword(s) 512 using an entity extraction scheme. In those instances, the event recognition module 280 may output the region of interest 482 to the user, together with the keyword frequency comparison 562 or the alert generated based on the keyword frequency comparison 562.

Figure 6:
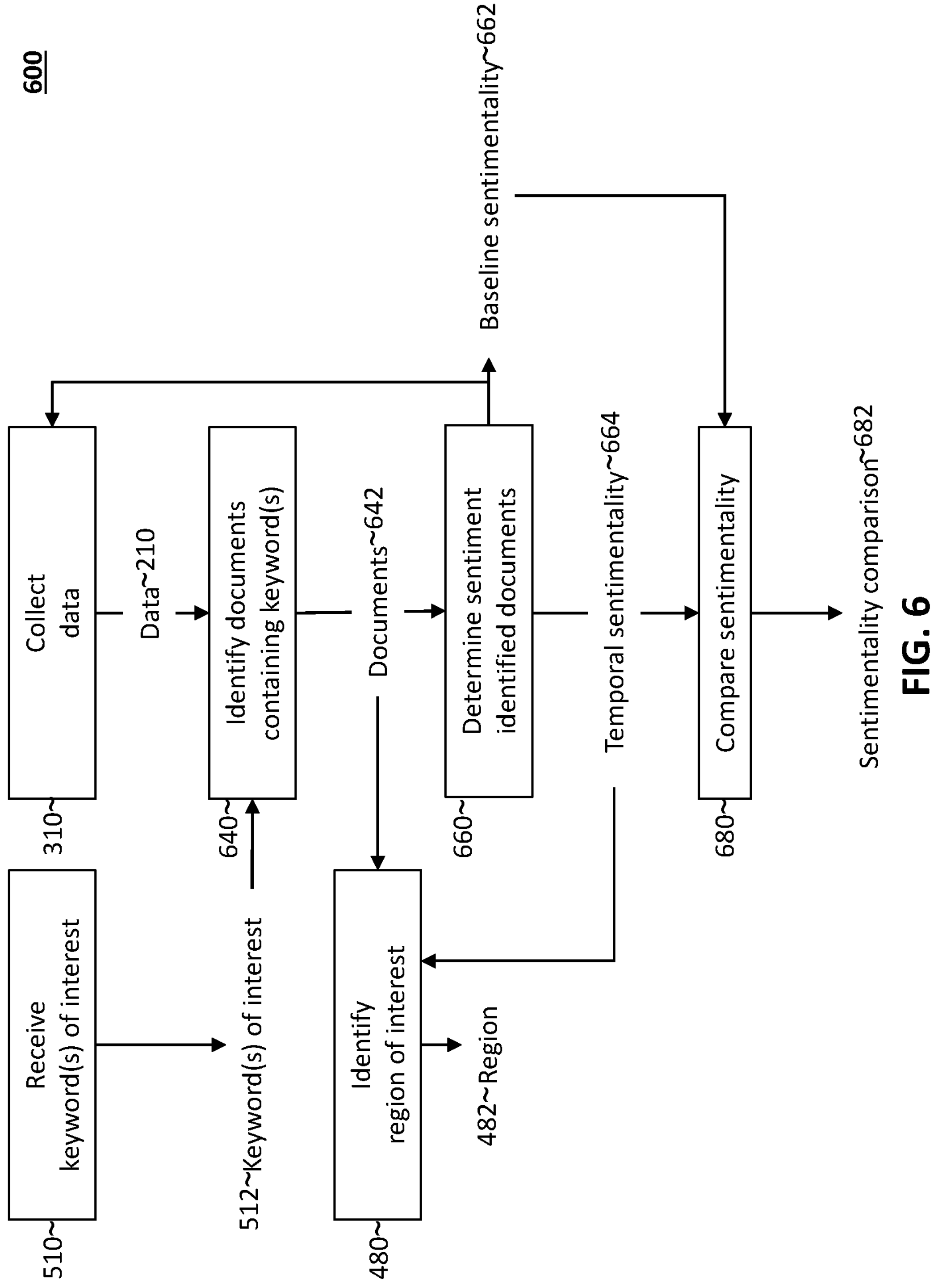
FIG. 6 is a flowchart illustrating a sentimentality recognition process according to an exemplary embodiment of the present invention.

FIG. 6 is a flowchart illustrating a sentimentality recognition process 600 (that may be performed, for example, by the event recognition module 280 of the server 120) according to an exemplary embodiment of the present invention.

One or more keywords of interest 512 are received from a user in step 510 and data 210 are collected in step 310.

Documents in the data 210 are analyzed in step 640 to identify the documents 642 containing the keyword(s) of interest 512 (e.g., using an entity extraction scheme).

A baseline sentimentality 662 (the sentiments expressed in the documents 642 containing the keyword(s) 512) is determined in step 660. Again, steps 310, 640, and 660 are recursive so that additional data 210 may be collected, additional documents 642 may be identified, and the temporal sentimentality 664 of the documents 642 containing the keyword(s) 512 may be determined over time. The event recognition module 280 may use any of the existing sentiment analysis methods in the art to determine baseline sentimentality 662 and the temporal sentimentality 664 of the documents 642 containing the keyword(s) 512.

In step 680, the temporal sentimentality 664 is compared to the baseline sentimentality 662 to determine changes in the temporal sentimentality 664 of the documents 642 containing the keyword(s) 512 relative to the baseline sentimentality 662 of those documents 642 (the sentimentality comparison 682). The event recognition module 280 may output the sentimentality comparison 682 to the user (e.g., graphically) as described below. Additionally or alternatively, the event recognition module 280 may generate and output an alert for a user in response to a determination that the sentimentality comparison 682 meets or exceeds a predetermined threshold.

In step 480, a region of interest 482 may be identified in the documents 642 that contain the keyword(s) 512 or the where the temporal sentimentality 644 meets or exceeds a predetermined threshold (e.g., where "fear" is more common than "anticipation"). Specifically, the event recognition module 280 may determine that the documents 642 were found in publications from or focused on particular geographic regions and/or identify named places in the documents 642. The event recognition module 280 may output the region of interest 482 to the user, together with the sentimentality comparison 682 or the alert generated based on the sentimentality comparison 682.

Figure 7:
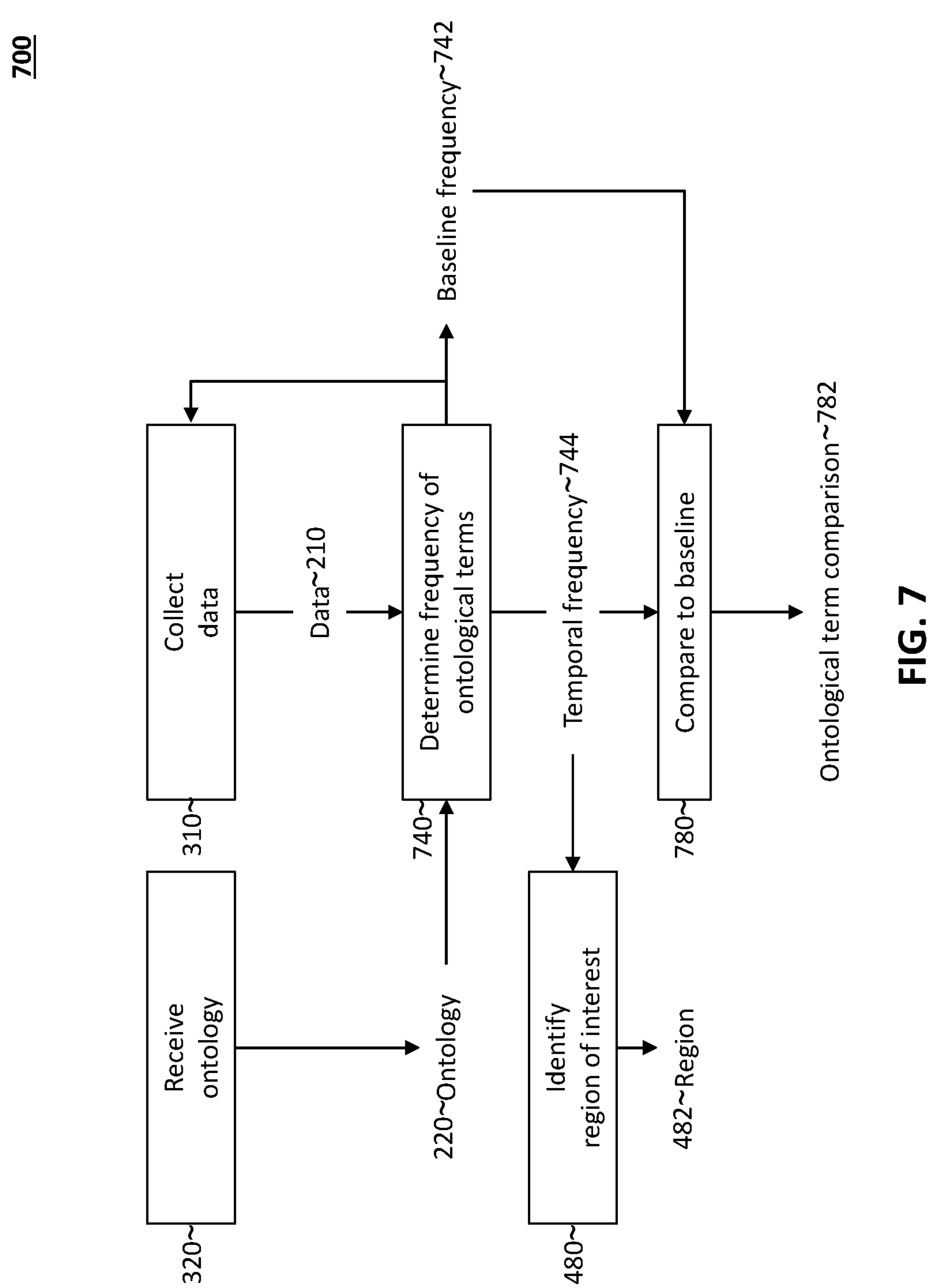
FIG. 7 is a flowchart illustrating an ontological term recognition process according to an exemplary embodiment of the present invention.

FIG. 7 is a flowchart illustrating an ontological term recognition process 700 (that may be performed, for example, by the event recognition module 280 of the server 120) according to an exemplary embodiment of the present invention.

An ontology 220 is received, for exampling using the same process 320 of the hypotheses generation process 300 described above. Data 210 are collected in step 310. Again, while the system 200 provides a domain agnostic platform that can utilize any domain-specific or generic data 210, the data 210 may be relevant to a particular domain of interest (such as food adulteration).

Documents in the data 210 are analyzed to determine the baseline frequency 742 of terms from the ontology 220 (e.g., using an entity extraction scheme) in step 740. The event recognition module 280 may search for all of the terms of the ontology 220 or, more specifically, the recognition module 280 may search for the ontological terms included in the highly-ranked hypotheses 260 identified using the hypothesis generation process 300. Again, steps 310 and 740 are recursive processes, meaning that updated data 210 may be collected and the temporal frequency 744 of terms from the ontology 220 may be determined over time.

In step 760, the temporal frequency 744 is compared to the baseline frequency 742 to determine changes in the temporal frequency 744 relative to the baseline frequency 742 of the terms from the ontology 220 (the ontological term comparison 782). The event recognition module 280 may output the ontological term comparison 782 to the user (e.g., graphically) as described below. Additionally or alternatively, the event recognition module 280 may generate and output an alert for a user in response to a determination that the ontological term comparison 782 meets or exceeds a predetermined threshold.

Again, a region of interest 482 may be identified in step 480. Specifically, the event recognition module 280 may determine that documents in the data 210 where the temporal frequency 744 of the terms from the ontology 220 exceed the baseline frequency 742 were found in publications from or focused on particular geographic regions. Additionally or alternatively, the event recognition module 280 may identify named places in the documents where the temporal frequency 744 exceeds the baseline frequency 742 using an entity extraction scheme. In those instances, the event recognition module 280 may output the region of interest 482 to the user, together with the ontological term comparison 782 or the alert generated based on the ontological term comparison 782.

Figure 8:
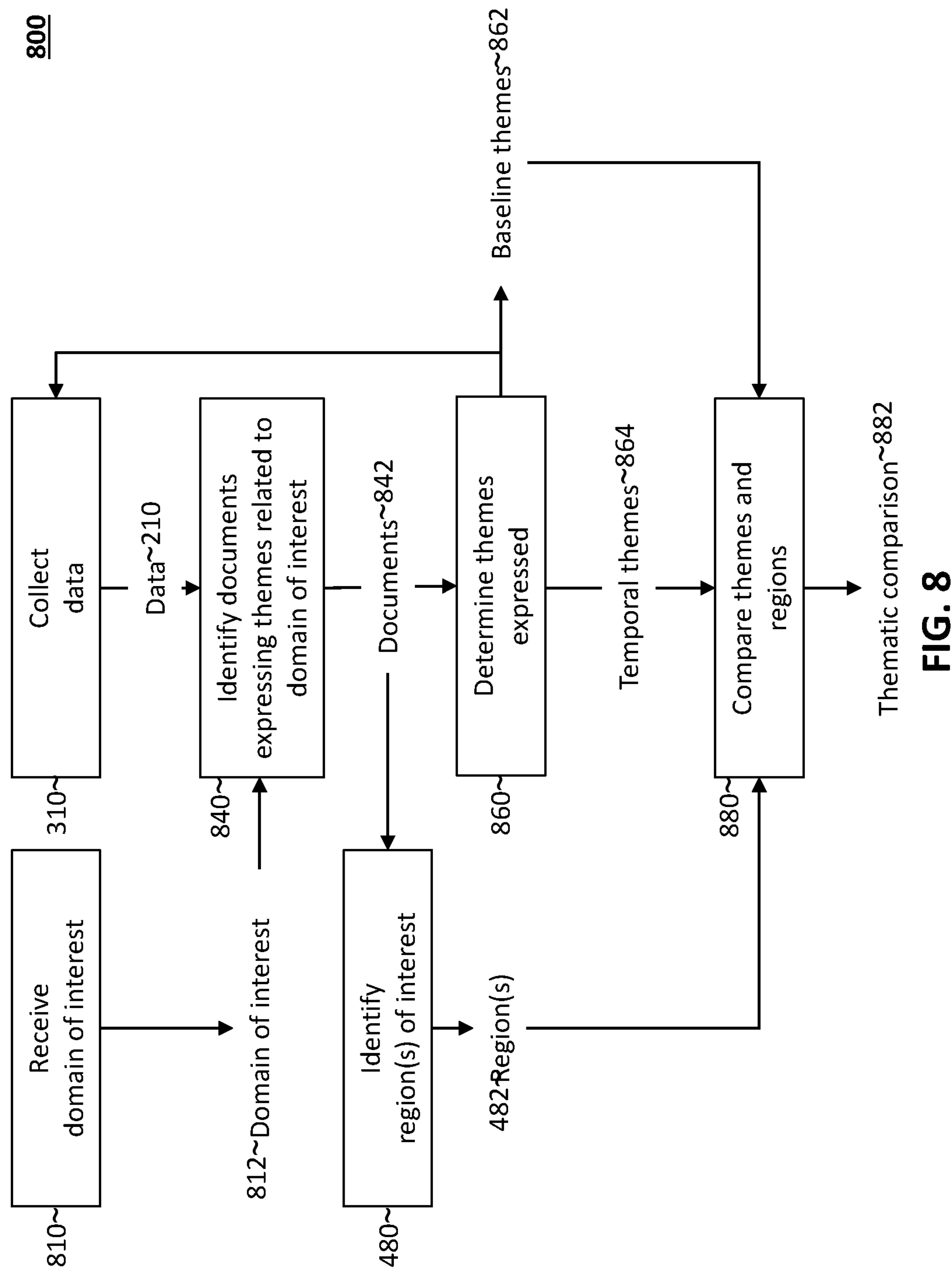
FIG. 8 is a flowchart illustrating a thematic recognition process according to an exemplary embodiment of the present invention.

FIG. 8 is a flowchart illustrating a thematic recognition process 800 (that may be performed, for example, by the event recognition module 280 of the server 120) according to an exemplary embodiment of the present invention.

A domain of interest 812 is received from a user in step 810 and data 210 are collected in step 310.

Documents in the data 210 are analyzed in step 840 to identify the documents 842 expressing themes related to the domain of interest 812. For example, the event recognition module 280 may utilize any of the many topic models known in the art to identify, such as Latent Dirichlet Allocation (LDA), probabilistic latent semantic analysis (PLSA), etc.

In step 860, the themes expressed in the documents 842 are identified to determine the baseline themes 862 expressed in the documents 842 related to the domain of interest 812. Again, steps 310, 840, and 860 are recursive so that additional data 210 may be collected, additional documents 842 may be identified, and the temporal themes 864 in the documents 842 may be determined over time.

In step 480, a region of interest 482 may be identified in the documents 842 (e.g., by determining if the documents 842 are from or focused on particular geographic regions and/or include named places).

In step 880, the temporal themes 864 are compared to the baseline themes 862 and the regions of interest 482 are compared over time (the thematic comparison 882).

The event recognition module 280 may output the thematic comparison 882 (and region(s) of interest 482) to the user (e.g., graphically) as described below and/or may generate and output an alert for a user in response to a determination that the thematic comparison 882 meets or exceeds a predetermined threshold.

As described above and shown below, the event recognition module 580 may output (or generate an alert based on)

multiple metrics comparisons 462, including one or more keyword frequency comparisons 562, sentimentality comparisons 682, ontological term comparisons 782, and/or thematic comparisons 882.

FIGS. 9A, 9B, and 9C are graphs illustrating baseline signals according to an exemplary embodiment of the present invention. FIG. 9A shows the number of articles per day (circles, left axis) and the number of articles relevant to an analyst looking for evidence of horsemeat substitution (squares, right axis) in 2011. FIG. 9B shows the top title word frequencies of the articles identified from 2011. FIG. 9C shows the top title sentiments of the articles identified from 2011.

Figure 10A:
FIGS. 10A, 10B, and 10C are graphs illustrating signals according to an exemplary embodiment of the present invention.
Figure 10A:
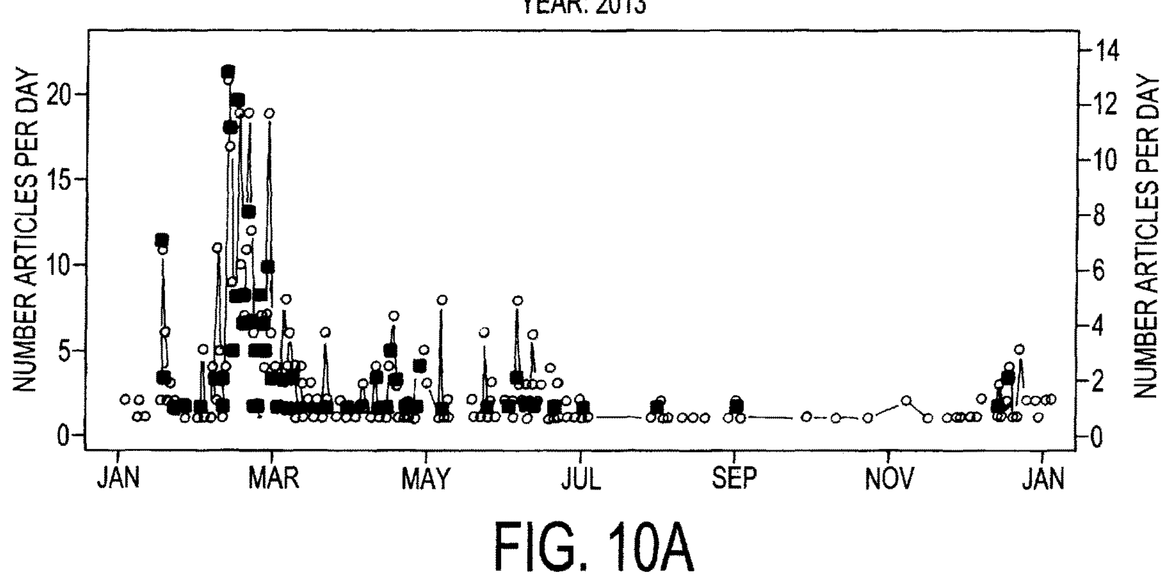
Figure 10B:
Figure 10B:
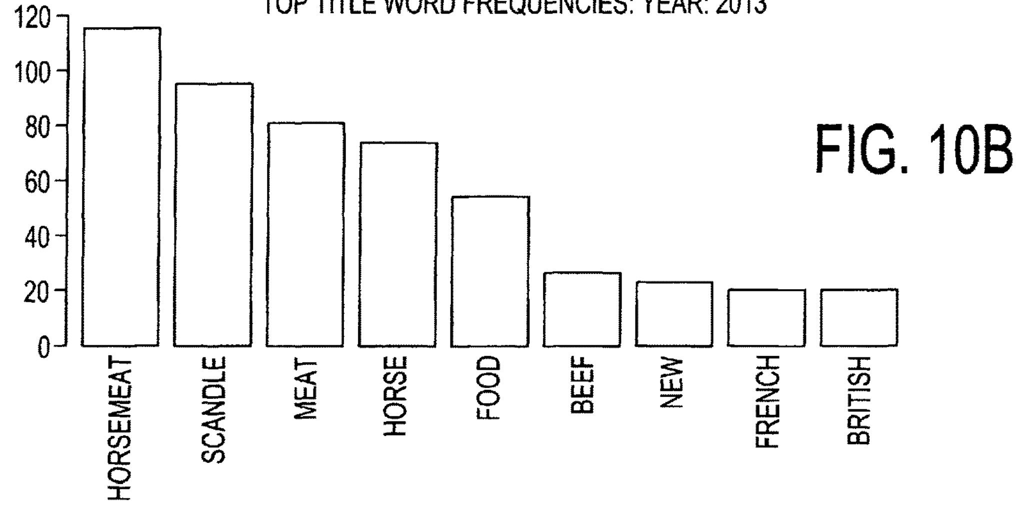
Figure 10C:
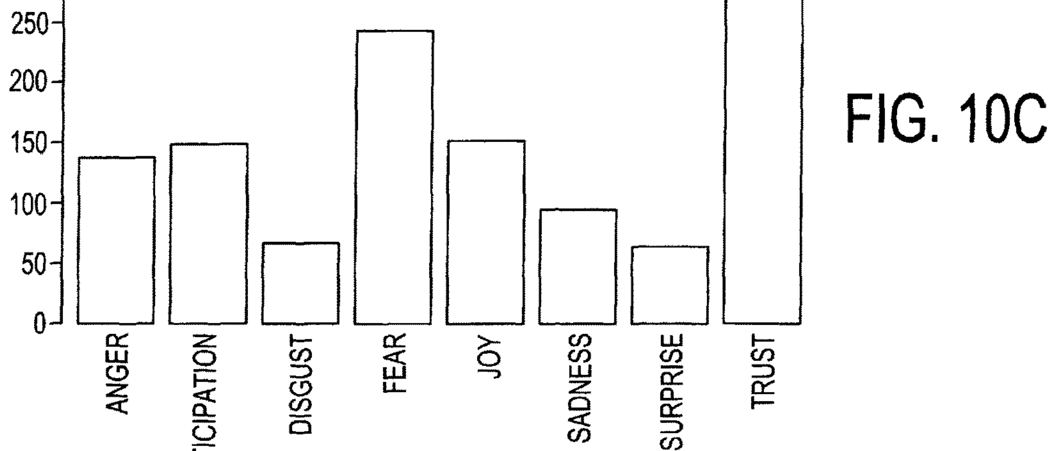

FIGS. 10A, 10B, and 10C are graphs showing temporal signals according to an exemplary embodiment of the present invention. FIG. 10A shows the number of articles per day (circles, left axis) and the number of articles relevant to an analyst looking for evidence of horsemeat substitution (squares, right axis) in 2013. FIG. 10B shows the top title word frequencies of the articles from 2013. FIG. 10C shows the top title sentiments of the articles identified from 2013.

As shown in FIG. 9A, only two relevant articles were identified in 2011. The rapid increases in the total number of articles per date was not correlated with occurrence of relevant articles. As shown in FIG. 9B, the most frequent words were not indicative of horsemeat incident. Regarding emotionality, "anticipation" was about as common as "fear" as shown in FIG. 9C. By contrast, in FIG. 10A, many relevant articles were identified in 2013. Persistent increases in the total number of articles per date appear to be correlated with occurrence of relevant articles. As shown in FIG. 10B, the most frequent words appear indicative of a horsemeat incident. Regarding emotionality, "fear" was much more common than "anticipation" as shown in FIG. 10C.

Figure 11:
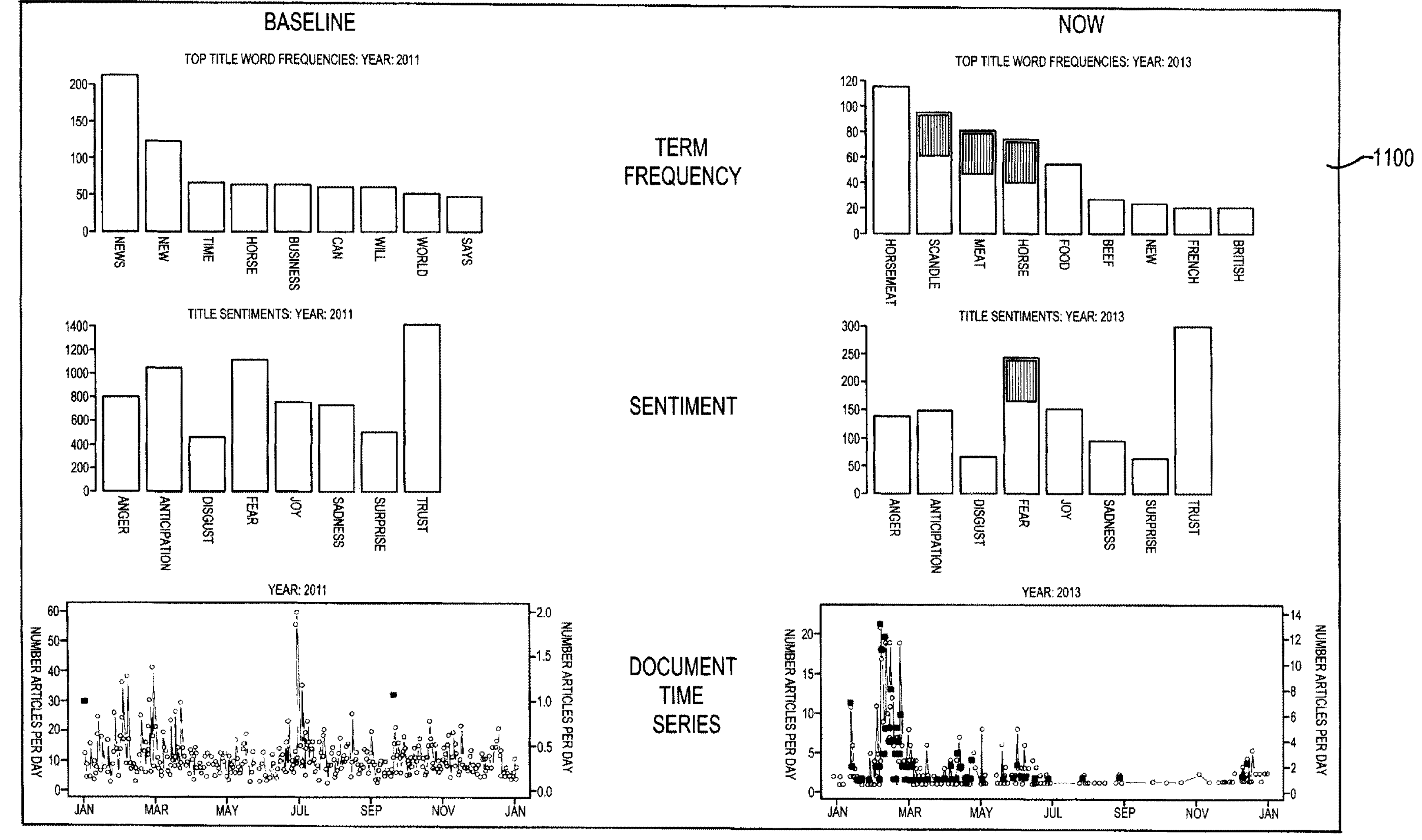
FIG. 11 illustrates a dashboard view of a graphical user interface according to an exemplary embodiment of the present invention.

FIG. 11 illustrates a dashboard view 1100 output by a graphical user interface (for example, the graphical user interface of a client device 160) according to an exemplary embodiment of the present invention.

As shown in FIG. 11, the system 200 may provide functionality for the user to view a previously established baseline (left column) of any number of metrics 218, including term frequency (e.g., as shown in FIG. 9B), sentiment (e.g., as shown in FIG. 9C), a document time series (e.g., as shown in FIG. 9A), etc. Additionally, the dashboard view 1100 may provide more current data (right column) of those metrics 218 to identify deviations from those baselines that may be indicative of an event of interest in a particular domain (e.g., a food integrity event).

Testing Generated Hypotheses

As described above, the system 200 generates hypotheses 260 by coding textual documents from a corpus of data 210 according to an ontology 220 and using an optimization algorithm to identify and rank neighborhoods in the resulting ontology space 240 that correspond with potentially relevant hypotheses 260. Meanwhile, the system 200 also provides functionality to identify events by extracting numerical metrics 218 from the data 210 and plotting changes to those numerical metrics 218. Accordingly, the system 200 provides unique functionality to both generate potentially relevant hypotheses 260 and test if evidence of those hypotheses 260 can be found in the available data 210.

To facilitate the identification of numerical metrics 218 that may provide evidence to test the identified hypotheses 260, the system 200 may include an observables library 290, which stores links between vocabulary terms (e.g., nouns and verbs) from the ontology 220 and observables data 210 used to construct the numerical metrics 218. Therefore, for each hypothesis 260 generated using the hypotheses generation process 300, the system 200 may use the links stored in the observables library 290 to identify relevant numerical metrics 218 to extract and plot to test that hypotheses 260. Accordingly, the system 200 provides functionality for a user to extract and plot the numerical metrics 218 associated with an identified hypothesis 260 or may automatically extract and/or plot the numerical metrics 218 that are associated with one or more of the hypotheses 260 generated by the system 200.

For example, the observables library 290 may store a link between the ontology term "drought" and observable data 210 such as temperature, rainfall, data from remote sensing equipment, etc. Therefore, if the hypotheses generation process 300 identifies a hypothesis 260 indicating a drought, the observables library 290 may link that hypothesis 260 to numerical metrics 218, such as numerical temperature records or satellite-derived Normalized Differential Vegetation Indices, that can be extracted and plotted to look for evidence of that hypothesis 260. Critically, the observables library 290 may link an ontological term in a hypothesis 260 to numerical metric(s) 218 that may or may not have been part of the data 210 that were used to generate that hypothesis 260.

The observables library 290 may store links between vocabulary terms in the ontology 220 and numerical metrics 218 already available in the data 210 stored on the storage media 140. Additionally or alternatively, the observables library 290 may store links between vocabulary terms in the ontology 220 and numerical metrics 218 available from persistently available third party data sources 110. Accordingly, the system 200 may provide functionality to download numerical metrics 218 from third party data sources 110 to test a generated hypothesis 260. For example, if the system 200 were to identify a hypothesis 260 that weather trends were causing price changes or ingredient shortages that could lead to food adulteration, the observables library 290 may assemble a timeline of weather reports in relevant geographic areas in collected documents already included in the data 210 or access weather data from persistent online data sources 110.

The links between the vocabulary terms in an ontology 220 and the relevant numerical metrics 218 in the observables library 290, which are preferably vetted by subject matter experts, may initially be received from a third party (either downloaded from a third party data source 110 via a network 130 or uploaded via a client computer 160). Over time, however, the system 200 may provide functionality for individuals using the system 200 to store additional links to numerical metrics 218 when using the system 200 to test hypotheses 260 that include the ontological terms. Accordingly, additions or augmentations to the observables library 290 will enable other users to quickly identify numerical metrics 218 when testing hypotheses 260 that include the same ontological terms. For example, additional links between vocabulary terms in the ontology 220 and relevant numerical metrics 218 may be added when testing hypotheses 260 discussing contaminants and tests used to discover contaminants, outbreaks related to weather trends, adulteration related to economic trends, etc.

Regardless of whether the system 200 is used to generate a hypothesis 260, expert users of the system 200 can identify, extract, and plot whatever numerical metric 218 that a particular expert intuits may provide evidence of a hypothesis 260 based on a priori knowledge. However, to better test those hypotheses 260, the system 200 uses links stored in the observables library 290 to automate identification of numerical metrics 218 that may be further beneficial to test that hypothesis 260.

Benefits of the System

As described above, the system 200 uses natural language processing and anomaly detection to apply the notion of a multifaceted signal of food supply integrity (or other signal of interest) as recorded in a corpus of textual data 210. Specifically, the system 200 combines several measures including trends in relevant documents recovered from keyword- or machine classifier-based retrieval, changes in sentiment expressed in the documents, the frequency of terms-of-interest in documents, the presence of leading indicators in documents (as identified, e.g., by term-of-interest frequency, n-grams of interest, etc.), and spatial and/or spatio-temporal clustering of named places appearing in relevant documents (as determined, e.g., by associations between words-of-interest and named places, and geographic clustering).

By combining quantitative factors, such as the numerical metrics 218 described above, the system 200 and/or a human analyst can identify events in an area of interest. Those qualitative factors can be selected based on user interest, as part of a statistical model (e.g., a Bayesian network), or a causal model of a food system (e.g., a supply chain, a production facility, etc.).

By constructing spatiotemporal signals of events robustly and reproducibly, the system 200 provides functionality to monitor for excursions from baseline in the superset or subsets of the factors described above (or other relevant factors) to assess the integrity or overall health of a food supply or other system and quickly and reliably identify events of interest, such as food safety events.

While preferred embodiments have been set forth above, those skilled in the art who have reviewed the present disclosure will readily appreciate that other embodiments can be realized within the scope of the invention. For example, disclosures of specific numbers of hardware components, software modules and the like are illustrative rather than limiting. Therefore, the present invention should be construed as limited only by the appended claims.

What is claimed is:

1. An automated method for recognizing an event in a geographic region, the method comprising:

receiving an ontology including ontological terms related to a domain of interest;

receiving documents by a server;

analyzing the documents, by the server, to identify the ontological terms and construct one or more temporal metrics indicative of events of interest in the domain of interest;

identifying, by the server, a relevant geographic region for each of at least some of the documents;

identifying, by the server, a baseline for each of the one or more temporal metrics;

analyzing additional documents, by the server, to identify the ontological terms in the additional documents, identify a relevant geographic region for each of at least some of the additional documents, and construct the one or more temporal metrics indicative of events of interest in the domain of interest;

identifying, by the server based on the analysis of one or more of the additional documents, a deviation from at least one baseline identified for at least one of the one or more temporal metrics; and identifying a geographic region of interest, by the server, by identifying the relevant geographic region of the one or more additional documents indicative of the deviation from the at least one baseline.

2. The method of claim 1, further comprising:

identifying a potential event of interest, by the server, based on the deviation from the at least one baseline.

3. The method of claim 1, wherein identifying the relevant geographic region of each document or additional document comprises:

identifying, in the document or additional document, one or more named places in the relevant geographic region; or determining that the document or additional document is from a publication from or focused on the relevant geographic region.

4. The method of claim 1, wherein identifying the geographic region of interest comprises identifying an emergence of documents associated with the geographic region of interest expressing themes related to the domain of interest.

5. The method of claim 1, wherein the one or more temporal metrics include:

a frequency of ontological terms indicative of the events of interest in the domain of interest; or a sentimentality of the documents or the additional documents that include the ontological terms.

6. The method of claim 1, wherein the ontological terms related to the domain of interest comprise keywords of interest received from a user.

7. The method of claim 1, wherein the additional documents comprise documents generated or received by the server after the documents.

8. The method of claim 1, wherein identifying the deviation from the at least one baseline comprises identifying an emergence of documents clustered in time expressing themes related to the domain of interest.

9. The method of claim 1, wherein the ontology comprises a plurality of elements, each of the elements comprise a plurality of ontological terms, the ontology defines ontological vectors comprising an ontological term from each of two or more of the plurality of elements, each of the ontological vectors describes a hypothesis, and the method further comprises:

forming an ontology space wherein each dimension of the ontology space comprises one or more of the elements of the ontology;

populating the ontology space by adding the ontological vectors identified in the documents such that a weight or each point in the ontology space is proportional to a number of ontological vectors associated with that point found in the documents;

using an optimization algorithm to rank points or clusters of points in the ontology space based on the weights of the points or the clusters of points; and outputting the ranked list of points or clusters of points, each point or cluster of points corresponding to one or more ontological vectors describing a hypothesis.

10. The method of claim 9, further comprising:

storing links between ontological terms included in the ontology and one or more temporal metrics; and constructing the one or more temporal metrics in response to a determination that a linked ontological term is included in an ontological vector in the ranked list of points or clusters of points.

11. A system, comprising:

non-transitory storage media configured to store:

documents; and an ontology including ontological terms related to a domain of interest; and a server comprising at least one computer processor configured to:

analyze the documents to identify the ontological terms and construct one or more temporal metrics indicative of events of interest in the domain of interest;

identify a relevant geographic region for each of at least some of the documents;

identify a baseline for each of the one or more temporal metrics;

analyze additional documents to identify the ontological terms in the additional documents, identify a relevant geographic region for each of at least some of the additional documents, and construct the one or more temporal metrics indicative of events of interest in the domain of interest;

identify, based on the analysis of one or more of the additional documents, a deviation from at least one baseline identified for at least one of the one or more temporal metrics; and identify a geographic region of interest by identifying the relevant geographic region of the one or more additional documents indicative of the deviation from the at least one baseline.

12. The system of claim 11, wherein the server is further configured to identify a potential event of interest based on the deviation from the at least one baseline.

13. The system of claim 11, wherein the server is configured to identify the relevant geographic region of each document or additional document by:

identifying, in the document or additional document, one or more named places in the relevant geographic region; or determining that the document or additional document is from a publication from or focused on the relevant geographic region.

14. The system of claim 11, wherein the server is configured to identify the geographic region of interest by identifying an emergence of documents associated with the geographic region of interest expressing themes related to the domain of interest.

15. The system of claim 11, wherein the one or more temporal metrics include:

a frequency of ontological terms indicative of the events of interest in the domain of interest; or a sentimentality of the documents or the additional documents that include the ontological terms.

16. The system of claim 11, wherein the ontological terms related to the domain of interest comprise keywords of interest received from a user.

17. The system of claim 11, wherein the additional documents comprise documents generated or received by the server after the documents.

18. The system of claim 11, wherein the server is configured to identify the deviation from the at least one baseline by identifying an emergence of documents clustered in time expressing themes related to the domain of interest.

19. The system of claim 11, wherein:

the ontology comprises a plurality of elements, each of the elements comprising a plurality of ontological terms;

the ontology defines ontological vectors comprising an ontological term from each of two or more of the plurality of elements, each of the ontological vectors describing a hypothesis; and the server is further configured to:

form an ontology space wherein each dimension of the ontology space comprises one or more of the elements of the ontology;

populate the ontology space by adding the ontological vectors identified in the documents such that a weight or each point in the ontology space is proportional to a number of ontological vectors associated with that point found in the documents;

use an optimization algorithm to rank points or clusters of points in the ontology space based on the weights of the points or the clusters of points; and output the ranked list of points or clusters of points, each point or cluster of points corresponding to one or more ontological vectors describing a hypothesis.

20. The system of claim 19, wherein:

the non-transitory storage media configured stores links between ontological terms included in the ontology and one or more temporal metrics; and the server is configured to construct the one or more temporal metrics in response to a determination that a linked ontological term is included in an ontological vector in the ranked list of points or clusters of points.

* * * * *